(12) United States Patent
Fahrbach (10) Patent No.: US 10,606,056 B2
(45) Date of Patent: Mar. 31, 2020

(54) METHOD FOR PRODUCING PREVIEW IMAGES WITH AN INCLINED-PLANE MICROSCOPE, INCLINED-PLANE MICROSCOPE, AND IMAGE PRODUCING DEVICE FOR AN INCLINED-PLANE MICROSCOPE

(71) Applicant: Leica Microsystems CMS GmbH, Wetzlar (DE)

(72) Inventor: Florian Fahrbach, Mannheim (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 0 days.

(21) Appl. No.: 16/332,814

(22) PCT Filed: Sep. 15, 2017

(86) PCT No.: PCT/EP2017/073300
§ 371 (c)(1),
(2) Date: Mar. 13, 2019

(87) PCT Pub. No.: WO2018/050832
PCT Pub. Date: Mar. 22, 2018

(65) Prior Publication Data
US 2019/0204573 A1  Jul. 4, 2019

(30) Foreign Application Priority Data

Sep. 16, 2016  (LU) .......................................... 93225

(51) Int. Cl.
*G02B 21/00* (2006.01)
*G02B 21/36* (2006.01)
*H04N 5/378* (2011.01)

(52) U.S. Cl.
CPC ........... *G02B 21/008* (2013.01); *G02B 21/00* (2013.01); *G02B 21/0032* (2013.01);
(Continued)

(58) Field of Classification Search
CPC .. G02B 21/008; G02B 21/00; G02B 21/0032; G02B 21/0076; G02B 21/36; G02B 21/364; G02B 21/367; H04N 5/378
See application file for complete search history.

(56) References Cited

U.S. PATENT DOCUMENTS

2016/0327779 A1\*  11/2016  Hillman ................ G02B 21/367
2019/0167081 A1\*  6/2019  Hillman ................ G02B 3/0087
(Continued)

FOREIGN PATENT DOCUMENTS

DE    102010013223 A1    9/2011
WO    WO 2013184758 A2   12/2013
WO    WO 2015109323 A2    7/2015

OTHER PUBLICATIONS

C. Dunsby, "Optically sectioned imaging by oblique plane microscopy", Optics Express, vol. 16, No. 25, Dec. 8, 2008, pp. 1-11.

*Primary Examiner* — John R Schnurr
(74) *Attorney, Agent, or Firm* — Leydig, Voit & Mayer, Ltd.

(57) ABSTRACT

A method for producing a preview image with an inclined-plane microscope with a tilted illumination plane include illuminating, at successive points in time, different illumination planes, which are tilted relatively to an optical axis of an optical viewing element and spaced apart from one another. The illumination planes are imaged onto a sensor with photosensitive elements arranged line-by-line. The preview image is produced by successively reading out strip-type read-out areas of the sensor, a longitudinal extension of the read-out areas being oriented parallel to the lines of the photosensitive elements, such that the preview image reproduces a viewing plane perpendicular to the optical axis of the optical viewing element.

15 Claims, 4 Drawing Sheets

(52) U.S. Cl.
CPC ......... *G02B 21/0076* (2013.01); *G02B 21/36* (2013.01); *G02B 21/364* (2013.01); *G02B 21/367* (2013.01); *H04N 5/378* (2013.01)

(56) References Cited

U.S. PATENT DOCUMENTS

| | | | |
|---|---|---|---|
| 2019/0204578 A1* | 7/2019 | Fahrbach | G02B 21/367 |
| 2019/0250388 A1* | 8/2019 | Hillman | G01J 3/2803 |
| 2019/0278073 A1* | 9/2019 | Hillman | G02B 21/22 |
| 2019/0302437 A1* | 10/2019 | Hillman | G02B 21/367 |
| 2019/0317312 A1* | 10/2019 | Hillman | G02B 21/0076 |

\* cited by examiner

METHOD FOR PRODUCING PREVIEW IMAGES WITH AN INCLINED-PLANE MICROSCOPE, INCLINED-PLANE MICROSCOPE, AND IMAGE PRODUCING DEVICE FOR AN INCLINED-PLANE MICROSCOPE

CROSS-REFERENCE TO PRIOR APPLICATIONS

This application is a U.S. National Stage Application under 35 U.S.C. § 371 of International Application No. PCT/EP2017/073300 filed on Sep. 15, 2017, and claims benefit to Luxembourgian Patent Application No. LU 93225 filed on Sep. 16, 2016. The International Application was published in German on Mar. 22, 2018 as WO 2018/050832 A1 under PCT Article 21(2).

FIELD

The invention relates to a method for producing a preview image with a microscope with a tilted illumination plane, particularly an inclined-plane microscope. The invention also relates to a microscope, particularly an inclined-plane microscope, and an image producing device for a microscope with a tilted illumination plane, particularly an inclined-plane microscope.

BACKGROUND

Scanning methods for three-dimensional imaging are known from the prior art, for example from C. Dunsby, "Optically sectioned imaging by oblique plane microscopy," Opt. Express 16, 20306-20316 (2008) or WO 2015/109323 A2. An inclined-plane microscope is, for example, a so-called light sheet microscope for viewing tilted planes. Furthermore, the designation "inclined-plane microscope" also includes oblique plane illumination microscopes (OPM) and swept confocally-aligned planar excitation (SCAPE) microscopes, both of which are 3D scanning microscopes.

Inclined-plane microscopes operate with confocally-arranged planar excitation or illumination, which is scanned in a pivoting movement through a sample in the SCAPE microscope, whereas in OPM, the planar excitation is scanned linearly relatively to the sample, for example by a displaceable lens or a linear displacement of the sample.

In both representative techniques, a single optical element of high numerical aperture (NA), for example a lens with a high NA, is used, on the one hand, to realize the planar illumination of an illumination plane and, on the other hand, to capture the scattered light or fluorescent light emitted by the illuminated illumination plane via the same optical element and to provide it for imaging detection and data processing.

Produced thereby are image stacks consisting of images of the illumination planes which were respectively recorded at successive points in time and which are parallel to one another in the case of OPM and substantially parallel to one another in the case of SCAPE microscopy. The individual illumination planes are tilted relatively to the optical axis of the lens, which is used for illumination and imaging of the illuminated illumination planes.

The position of the various illumination planes is varied by a scanning element, for example a, preferably motorized, translation stage displaces a lens or lens arrangement or the sample (OPM) or by tilting a scanning mirror (SCAPE). The scanning element displaces or tilts both an illumination beam path and an observation beam path relatively to the examined sample.

If the user of an inclined-plane microscope wants to obtain a preview image of the examined sample in real time, this preview image for orientation in the sample can be obtained in that only the imaging of a single illuminated illumination plane in the sample is evaluated and reproduced, or a preview image is generated from the entire recorded image stack.

A disadvantage of the first procedure is that the preview image is tilted relatively to the optical axis of the lens, which makes the orientation in the sample more difficult for the user.

The disadvantage of the second approach is that the preview images cannot be delivered in real time and a movement of the sample by the user thus cannot be tracked instantaneously.

SUMMARY

In an embodiment, the present invention provides a method for producing a preview image with an inclined-plane microscope with a tilted illumination plane. The method includes illuminating, at successive points in time, different illumination planes, which are tilted relatively to an optical axis of an optical viewing element and spaced apart from one another. The illumination planes are imaged onto a sensor with photosensitive elements arranged line-by-line. The preview image is produced by successively reading out strip-type read-out areas of the sensor, a longitudinal extension of the read-out areas being oriented parallel to the lines of the photosensitive elements, such that the preview image reproduces a viewing plane perpendicular to the optical axis of the optical viewing element.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Embodiments of the present invention provide a method, a microscope, and an image producing device, which enable the generation of preview images in an inclined-plane microscope in real time, wherein the plane reproduced in the preview images is to be oriented parallelly to the boundary surface of the sample or perpendicularly to the optical axis of the optical viewing element.

The method according to an embodiment of the invention achieves these advantages by illuminating different illumination planes, which are tilted relatively to an optical axis of an optical viewing element and spaced apart from one another at successive points in time and imaging them on a sensor with photosensitive elements arranged in lines, and by reading out at least one strip-type read-out area of the sensor that is oriented parallelly to the lines in its longitudinal extension and that can be read out in a read-out step, wherein a preview image is generated from the read-out areas read out successively, which preview image depicts a viewing plane perpendicular to the optical axis of the optical viewing element.

The above-mentioned microscope according to an embodiment of the invention achieves the above advantages in that different illumination planes, which are tilted relatively to an optical axis of an optical viewing element and are spaced apart from one another, are present at successive points in time and are imaged on a sensor of the microscope, which comprises photosensitive elements arranged line-by-line, wherein the microscope has an image data processor with an interface for outputting a preview image, which depicts a viewing plane perpendicular to the optical axis of the optical viewing element, wherein the sensor comprises at least one strip-type read-out area that is oriented parallelly to the lines in its longitudinal extension and that can be read out in one read-out step and wherein the preview image is composed of successively read-out strip-type read-out areas of the image of the successively illuminated illumination planes.

The above-mentioned image producing device according to an embodiment of the invention for a microscope with a tilted illumination plane, in particular an inclined-plane microscope, such as a 3D scanning or SCAPE microscope or oblique plane microscope, which successively illuminates a plurality of illumination planes, which extend obliquely relatively to an optical axis of an optical viewing element and are spaced apart from one another and images them on a sensor, achieves the above advantages in that the image producing device comprises the sensor comprising photosensitive elements arranged line-by-line and an image data read-out device with an output, at which at least one strip-type read-out area, which is oriented parallelly to the lines along its longitudinal extension and read out, of the image of the respective illumination plane is provided, and comprises an image data processor, by means of which a preview image, which depicts a viewing plane perpendicular to the optical axis of the optical viewing element, is generated from the read-out areas which have been read out.

The method and microscope according to embodiments of the invention and the image producing device according to an embodiment of the invention have the advantage that a preview image of the sample to be examined is provided, which preview image is aligned perpendicularly to the optical axis of the optical viewing element. Such an alignment corresponds to the alignment of microscope images familiar to the user and thus considerably facilitates the orientation in the sample. Furthermore, the method according to an embodiment of the invention and the microscope according to an embodiment of the invention as well as the image producing device have the advantage that the preview image can be generated and displayed in real time so that a fast alignment of the sample is possible. This is possible because the entire area sensor is not read out according to the invention as in the prior art but only the at least one read-out area, which can be read out in a read-out step. Such a read-out area is determined by the sensor used and its smallest unit to be read out in a read-out step.

The orientation of the read-out area ensures that it can also be read out for the preview image. The speed advantage thereby achievable enables the preview image to be generated in real time.

The generation of the preview image in real time also has the advantage that the so-called rolling shutter effect can be minimized or suppressed in comparison with the generation of a preview image from the complete image stack. This effect can occur if an object is moved or moving, in particular perpendicularly to the direction of movement of a moving shutter, i.e. a moving aperture (this corresponds, for example, to the illumination plane moved by means of the scanning element in an inclined-plane microscope), and can lead to distortion of the recorded image.

The time required for reading out an area sensor scales more linearly with the number of lines to be read out, whereas the number of columns to be read out does not influence the read-out time. The reading-out of respectively only at least one strip-type read-out area oriented parallelly to the lines along its longitudinal extension achieves a speed advantage in comparison to the reading-out of complete columns, wherein said speed advantage ensures that a preview image of an examined sample with rapid momentum has no such distortion.

In the following, different embodiments are described, which are respectively advantageous by themselves and can be combined as desired.

According to the method according to an embodiment of the invention, at least one read-out area is preferably read out with the sensor, which can be a line sensor or area sensor to be read out area-by-area. The read-out area is thus to be understood as the smallest unit of the corresponding sensor that can be read out in a read-out step. In the case of a line sensor, the read-out area may comprise the complete line; in the case of an area sensor to be read out section-by-section, it may comprise an area comprising a plurality of lines. With each read-out step, at least one complete line of the corresponding sensor, more specifically the charge distribution generated by the image of the illuminated illumination planes, can thus preferably be read out and transmitted, for example, to a converter for further processing.

The read-out area can be regarded as a data field consisting of the photosensitive elements directly next to one another and adjacent to one another. The data field of a line sensor may comprise the entire line or a plurality of coherent photosensitive elements; the data field of an area sensor to be read out area-by-area may comprise one or more lines and preferably cover a plurality of columns section-by-section.

The strip-type read-out areas are preferably oriented parallelly to the lines in their longitudinal extension, i.e. they have a two-dimensional geometry in the form of a strip, the strip being oriented parallelly to the line of the line sensor or parallelly to the lines of the area sensor, for example.

The method according to an embodiment of the invention is based on the image of the illumination planes imaged on a sensor at successive points in time. Each of the illumination planes is preferably illuminated by means of a suitable illumination according to the optical structure of the corresponding inclined-plane microscope, imaged by the optical viewing element, and imaged on the area sensor by means of an erecting unit in a planar manner, i.e. in a straight plane.

It is also possible for the sensor to be a separate sensor on which the illumination planes can be imaged without erecting a tilted intermediate image. For this purpose, a beam splitter, for example, may divert a portion of the light propagating along an observation beam path onto the separate sensor. This beam splitter or the sensor can be designed to be pivotable into the observation beam path. In the method, microscope, and image producing device according to embodiments of the invention, a preview strip can thus be projected onto the strip of a detector plane.

A scanning element, for example a scanning mirror or a translation stage, can be used to illuminate different illumination planes tilted respectively relatively to the optical axis of the optical viewing element and spaced apart from one another at successive points in time. Preferably, each of the illuminated illumination planes is imaged on the sensor.

The respectively imaged illumination plane generates, according to the intensity distribution of the image, a charge distribution on the area of the sensor consisting particularly of a plurality of photosensitive elements, for example pixels. According to the invention, this charge distribution must however not be read out entirely, but only the charge distribution of the read-out area is read out from the sensor. The read-out area which has been read out corresponds to the intensity distribution of a strip-type section of the image of the illuminated illumination plane.

In a further embodiment of the method according to the invention, a preview strip of each of the illumination planes generated at successive points in time is imaged as a strip image on the sensor, wherein the strip image comprises at least one read-out area that can be read out in a read-out step. The strip image may, in particular, correspond to a whole number of read-out areas.

According to the method, microscope, and image producing device according to the invention, only one preview strip of the illumination plane is used for generating the preview image from the illumination planes illuminated at different points in time. The respective preview strip is not optically selected, i.e. the entire illumination plane continues to be illuminated, but is defined by the selection, in particular the size, of the strip image.

During illumination of an illumination plane, only the area of the sensor covered by the strip image is read out, which requires a corresponding number of read-out steps according to the number of read-out areas of the strip image.

In a further embodiment of the method, the at least one read-out area is respectively read out from the sensor at the beginning of a read-out process. This has the advantage that the read-out process can be stopped or aborted after the strip image has been read out, which results in a time saving. If an area sensor comprises, for example, a number of about 1000 lines with any number of photosensitive pixels and a read-out area comprises a complete line, wherein the strip image comprises only 10 pixels, the read-out speed can thus be increased by approximately a factor of 100, if only the first 10 lines must be read out. Generally, the read-out speed does not increase in comparison to reading out the entire sensor when, additionally or only, the ten last lines of the 1000 lines of the sensor are read out. In other embodiments, the read-out area may comprise several lines so that less than ten read-out steps may be necessary to read out the ten lines mentioned by way of example. The number of read-out steps depends on the size of the smallest unit of the sensor that can be read out in a read-out step.

The area sensor preferably has a two-dimensional structure of photosensitive pixels, for example photodiodes, which can be addressed by means of a line and column parameter. The area sensors preferably have a read-out direction, which is oriented along the columns of the area sensor and is directed from a read-out end to a read-out beginning. Such a defined read-out direction is based on the direction of displacement of the charges generated in the individual photosensitive elements so that this read-out direction can be understood as a physical read-out direction. In other words, such an area sensor is read out starting with the lines located at the read-out beginning, wherein the lines of the area sensor that are located at the read-out end, are only read out at the end of read-out process.

Since a line sensor only comprises a line of photosensitive pixels, it uses only the column parameter for addressing the photosensitive pixels. In such a line sensor, the generated charge distribution of the line is generally completely read out in a read-out step.

The sensor preferably has a CCD sensor and/or a CMOS sensor. In particular, the sensor can be an area sensor.

In the method according to the invention, a preview strip of each of the illumination planes can be imaged in a manner oriented substantially parallelly to the lines, wherein the preview strip can be cut substantially symmetrically by the respective viewing plane, preferably in its transverse extension. This has the advantage that the read-out strips of the charge distribution of the area sensor correspond to a section of the illuminated illumination plane, which section is arranged in close proximity to the viewing plane perpendicular to the optical axis of the optical viewing element.

In a further embodiment of the method according to the invention, strip-type sections of the illuminated illumination plane, which extend along an illumination direction and are thus tilted relatively to the optical axis, are imaged along the columns of the area sensor. This has the advantage that areas of the sample, which are situated away from the preview plane along or opposite the optical axis of the optical viewing element, are imaged in areas, which are not read out, of the line sensor or of the area sensor to be read out area-by-area.

In a further embodiment of the method according to the invention, the preview strip of each of the illumination planes is imaged on the read-out beginning of the sensor. This has the advantage that the image information relevant to the preview image is imaged in an area of the sensor that is read out at the beginning of the read-out process and thus accelerates the generation of the preview image. The preview strip is to be understood here as a section of the respective illuminated illumination plane. The preview strip is substantially defined by the number of lines viewed at the read-out beginning of the area sensor.

Since only the existing line can be read out in the case of a line sensor, this line corresponds to the read-out beginning.

If, for example, the first 10 lines of the read-out beginning of an area sensor are viewed, and if they have a size of 5 to 6 µm, for example, the preview strip has a width of approximately 3 to 6 µm given an enlargement of approximately 10 to 20 times by the optical viewing element. However, the preview strip is not optically selected since substantially the complete illumination plane is imaged on the area sensor but instead is selected based on the read-out of a limited number of lines of the area sensor.

Since the image of the preview strip, i.e. the strip image, is preferably located at the read-out beginning of the sensor and also oriented parallelly to the lines, the image information relevant to the preview image can be read out very quickly at the beginning of the read-out process, without the complete sensor having to be read out.

The read-out beginning of the sensor may particularly be a line thereof. When starting the read-out process, the complete line of the sensor that is closest to the read-out beginning can thus be read out in a read-out step. Consequently, the image information present in the form of a charge carrier distribution corresponding to the brightness distribution is read out first during reading-out of the sensor.

In a further embodiment of the method according to the invention, the strip extends over at least two sensors that can be read out separately. This has the advantage that image information can be read out simultaneously from the at least two separate sensors, which reduces the read-out time. The at least two separate sensors are preferably designed as area sensors to be read out section-by-section.

In a further embodiment of the method according to the invention, the read-out areas of each strip image read out in succession are corrected and/or averaged as a function of a tilt angle of the respective illumination plane with respect to the optical axis of the optical viewing element and/or as a function of a distance between illumination planes illuminated at different points in time, and the preview image is thus generated. During the correction, the parallelogram-shaped, shifted representation of an originally rectangular area is corrected so that once again the original, rectangular shape is present.

The read-out areas read out at different points in time preferably correspond to a stack of preview strips, wherein the individual preview strips are spaced apart from each other and are tilted with respect to the optical axis of the optical viewing element. The plurality of strips read out corresponds to a volume, which includes the viewing plane and extends substantially perpendicularly to the optical axis of the optical viewing element and has a small expansion along the optical axis that may be within a range of a few micrometers.

In order to obtain a corrected, two-dimensional image of the viewing plane, it is thus necessary to correct the partially overlapping preview strips, in particular the volumes composed of said strips, and average them along the optical axis. This generates a virtual projection of the volume along the optical axis of the lens of the optical viewing element.

In a further embodiment of the method according to the invention, the sensor is displaced in order to modify the position of the image of the illumination plane relative to the sensor. When the read-out area read out from the sensor is maintained, only a different section of the image of the illumination plane, i.e. another strip image, specifically the charge distribution of the corresponding read-out area, is read out by the movement of the sensor.

If the displacement of the sensor is perpendicular to the direction parallel to the lines, the reproduced viewing plane can be displaced along the optical axis of the optical viewing element. In contrast thereto, with a movement of the sensor along the direction parallel to the lines, the image section of the viewing plane can be varied while maintaining a constant distance from the optical viewing element.

The displacement of the sensor can preferably take place in its plane. With a movement of the sensor along or opposite its normal vector, a focusing of the image of the respective illumination plane, that is the focusing of the strip image on the sensor, is possible.

Furthermore, it is also possible to vary the position of the illumination plane, which is reproduced by the preview image, by displacement of the sample to be examined with respect to the microscope.

According to an advantageous design, the aforementioned microscope according to the invention may further have an illumination device for generating a plane illumination in an illumination plane. With this illumination device and a scanning element, for example a scanning mirror or translation stage, different illumination planes can be illuminated in the microscope at successive points in time. In other words, different areas of a sample are illuminated by the illumination device at different times, the areas being illuminated two-dimensionally, that is planarly. Due to the shape of the illuminated illumination plane, it can be called a light sheet, wherein the position of the respective light sheet in the sample changes over time, in particular as a function of the scanning element.

The respective illumination planes are illuminated through the optical viewing element by means of the illumination device, wherein the optical viewing element simultaneously images the scattered light or fluorescent light emitted by the illumination plane on the sensor.

The image data processor may have an image data read-out unit and a memory for buffering the read-out charge distributions of the sensor.

The optical viewing element of the microscope images the scattered or fluorescent light of an illumination plane tilted with respect to the optical axis of the optical viewing element on the sensor, wherein the sensor can be a line sensor or an area sensor to be read out area-by-area.

A preview strip oriented perpendicularly to the illumination direction of the illumination plane can be imaged as a strip oriented parallelly to the lines. As already described above, the preview strip is defined by the strip image that comprises at least one read-out area and is read out from the sensor.

In a further embodiment of the microscope according to the invention, the area sensor has at least one field of photosensitive elements, which form at least two read-out areas, which are to be read out serially in a read-out direction, wherein at least one read-out area is located at the read-out beginning of the sensor and wherein the image of a preview strip is aligned perpendicularly to the read-out direction. The image of the preview strip perpendicular to the read-out direction has the advantage that the charge distribution in the sensor caused by the preview strip, i.e. the charge distribution in the field of the photosensitive elements, can be read out along the narrower expansion of the image of the preview strip or the strip image. The read-out process is thus significantly accelerated in comparison with the orientation of the strip image along the read-out direction. As physical read-out direction, the read-out direction is oriented from the read-out end to the read-out beginning and corresponds to the displacement direction of the charge distribution generated in the respective sensor.

The line sensor also has a field of photosensitive elements to be read out serially in a read-out direction, but this field is one-dimensional. Since a line sensor only comprises a line which is read out in a single read-out step, it is not possible to specify a read-out direction for such a line sensor.

Since the photosensitive elements of the line sensor have an expansion perpendicular to the line, the image of the preview strip imaged on the line sensor has a width of a photosensitive element and the length of the line of the line sensor.

The preview strip is preferably imaged on the read-out beginning of the sensor so that the charge distribution caused by it can be read out in the sensor at the start of the read-out process without a complete read-out process having to be carried out.

In a further embodiment of the microscope according to the invention, at least two sensors are provided, the read-out beginnings of which are arranged opposite each other and substantially parallelly to each other. Such an arrangement of two sensors, in particular area sensors, has the advantage that the read-out process can be accelerated substantially by a factor of 2. The plurality of area sensors can be structurally combined and in particular designed as area sensors to be read out section-by-section. Likewise, 3, 4 or more area sensors may be present, the read-out beginnings of which are adjacent to or opposite one another along the orientation of the lines.

In a further embodiment of the microscope according to the invention, the preview strip is imaged on at least one read-out beginning. This has the advantage that the charge distribution of the sensor generated by the image of the preview strip can be read out without the sensor having to be read out completely.

The preview strip is preferably symmetrically imaged on the read-out beginnings of the at least two or more sensors, in particular area sensors, so that the preview strip is imaged on the sensors, in particular on their read-out beginnings, and a charge distribution corresponding to the intensity of the preview strip is generated. The image of the preview strip in this case corresponds to the strip image, which comprises at least one read-out area.

Furthermore, each of the at least two sensors can have a separate read-out module so that the sensors can be read out simultaneously along their respective read-out direction.

The at least two sensors may have linear read-out beginnings, wherein a preview strip imaged on the at least two sensors, in particular area sensors, is preferably oriented parallelly to the lines.

If the above example is used, in which ten lines of a single area sensor were read out in order to generate a preview image, five lines located at the respective read-out beginning of the area sensor can be read out in the embodiment of the microscope comprising two area sensors while maintaining the properties of the preview image, the time required for this being essentially halved by reading out the respective five lines of both area sensors in parallel.

In a further embodiment of the microscope according to the invention, the at least one sensor is arranged displaceably along the longitudinal extension of the at least one read-out area and/or along or opposite its read-out direction. This has the advantage that the viewing plane perpendicular to the optical axis of the optical viewing element can be displaced along the optical axis without displacing the sample to be examined.

The sensor can, in particular, be displaceable perpendicularly to a direction parallel to the lines in the imaging plane of the image of the illumination plane.

By means of a displacement of the sensor along or opposite its read-out direction, the section, which is read out, of the image of the respective illumination plane can be varied in the microscope, method, and/or image producing device according to the invention. Since the section is identical for all illumination planes illuminated at different points in time due to the movement of the respective sensor, the viewing plane is displaced only in parallel along the optical axis of the optical viewing element.

Furthermore, the at least one sensor may also be displaceably arranged parallelly to the direction parallel to the lines or perpendicularly to its read-out direction. Such a displacement can be used to shift the image area under consideration.

A displacement of the at least one sensor along its normal vector can be provided in order to readjust the focusing of the image of the illumination plane on the sensor.

In a further embodiment of the microscope according to the invention, the at least one sensor is arranged rotatably about its normal vector in at least two rotational positions oriented substantially perpendicular to one another. This has the advantage that either a preview image which reproduces the viewing plane perpendicular to the optical axis of the optical viewing element is generated with the microscope or a preview image which can reproduce a vertical viewing plane spanned by the propagation direction of the illumination of the illumination plane and the optical axis is generated. Both horizontal and vertical sectional images of a sample to be examined can thus easily be generated in real time.

A line sensor may be considered a one-dimensional sensor but, due to the planar expansion of its photosensitive elements, has a surface in relation to which a normal vector can be defined.

In a further embodiment of the microscope according to the invention, the image data processor comprises a correction and/or averaging device, which corrects and/or averages the strip-type read-out areas of the respective strip image read out by an image data read-out device at successive points in time as a function of a tilt angle of the respective illumination plane with respect to the optical axis of the optical viewing element and/or as a function of a distance between illumination planes illuminated successively in time and generates the preview image. As already explained above in the course of the method, this embodiment has the advantage that a preview volume composed of strips that are tilted and/or spaced apart from one another can be projected onto a two-dimensional preview image without deformation, e.g. distortion.

The correction and/or averaging device may comprise a plurality of sub-assemblies that perform suitable averaging. This averaging may take place, for example, by an averaging device or an integrator.

The image producing device according to the invention described at the outset can be understood as an additional component or additional assembly for a microscope with a tilted illumination plane. It may, for example, be integrated into an existing microscope with tilted illumination plane as an auxiliary module or an upgrade module. The image producing device only reads out the strip image, which comprises at least one read-out area, wherein this strip image corresponds to a preview strip located in the respective illumination plane and oriented perpendicularly to the illumination direction of the illumination plane. The strip image read out can be read out and provided at a considerably higher speed than is the case, for example, with a completely read-out sensor.

The invention is explained in more detail below with reference to the different embodiments of the invention shown in the attached figures. Technical features of the embodiments can be combined with each other and/or omitted as desired, unless the technical effect generated with the omitted technical feature is of importance. The same technical features and technical features with the same technical effect are provided with the same reference numerals.

Figure 1:
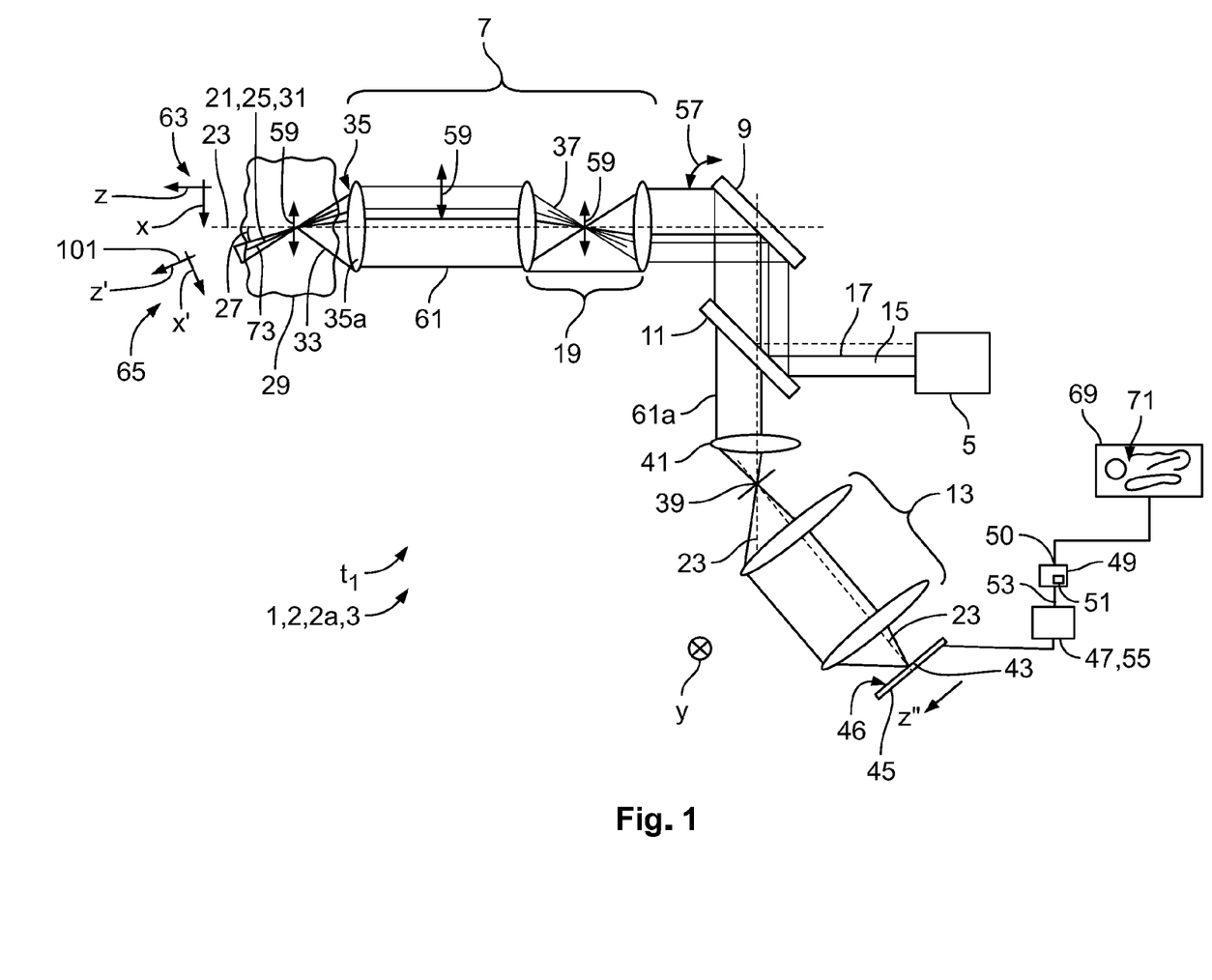
FIG. 1 a schematic illustration of an inclined-plane microscope.

FIG. 1 shows a schematic view of a microscope 2, in particular a SCAPE microscope 3, designed as a 3D scanning microscope 1. It has an illumination device 5, an optical viewing element 7, a scanning mirror 9, a dichroic mirror 11, and an optical imaging element 13. The SCAPE microscope 3 shown is to be understood as a specific embodiment of an inclined-plane microscope 2a.

In the following, the present invention is described based on a SCAPE microscope 3. This description does not explicitly limit the present invention to SCAPE microscopes 3 but instead refers to any type of inclined-plane microscope 2a, wherein the invention is described in a merely representative manner based on a SCAPE microscope 3.

The illumination device 5 emits light 15, which runs along an illumination beam path 17 and is deflected at the dichroic mirror 11. From the dichroic mirror 11, the illumination beam path 17 further extends to the scanning mirror 9, which deflects the light 15 of the illumination beam path 17 in the direction of a telescope 19, which is used for enlargement, which is discussed below.

Upon exiting the optical viewing element 7, the illumination beam path 17 has a convergence and is focused in a focus area 21 by the optical viewing element 7. The illumination beam path 17 is not fed paraxially into the telescope 19 and also does not extend paraxially within the optical viewing element 7. As a result, the focus area 21, which is in the form of a line, is tilted relatively to an optical axis 23 of the optical viewing element 7.

In the SCAPE microscope 3 shown in FIG. 1, the focus area 21 is two-dimensional, which means that it extends into or further out of the drawing plane and forms a light sheet 25. The light sheet 25 is tilted with respect to the optical axis 23 at a tilt angle 27 and is in a schematically illustrated sample 29.

The light sheet 25 thus forms an illuminated illumination plane 31 from which scattered or fluorescent light 33 comes into a pupil 35 of the optical viewing element 7 defined by a front lens 35a.

The scattered or fluorescent light 33 passes through the optical viewing element 7 and generates a first intermediate image 37 in the telescope 19, which intermediate image is imaged as a second intermediate image 39 after a further lens 41 by the telescope 19 and the further lens 41.

Both the first 37 and the second intermediate image 39 are tilted in relation to the respective optical axis of the optical imaging element.

FIG. 1 also shows that the optical imaging element 13 is tilted relatively to the optical axis 23 of the further lens 41 (the further lens 41 can be regarded as an optical element of the optical viewing element 7) so that the optical imaging element 13 focuses the second intermediate image 39 of the illumination plane 31 in a focal plane 43, which is oriented perpendicularly to the optical axis 23 of the optical imaging element 13.

The illumination plane 31 is imaged planarly on at least one line sensor 44 or an area sensor 45 in the focal plane 43. The area sensor 45 is, for example, a two-dimensional CCD or CMOS sensor. An image 46 of the illumination plane 31 thus exists on the area sensor 45.

FIG. 1 further shows a schematically represented image data read-out device 47 and an image data processor 49, which is connected to the image data read-out device 47, comprises a correction and/or averaging device 51 and provides an interface 50.

The image data read-out device 47 further comprises an output 53 and represents an image producing device 55 in the embodiment illustrated in FIG. 1.

FIG. 1 further shows that the scanning mirror 9 can be tilted along a tilt direction 57 so that the illumination beam path shifts along a displacement direction 59 in the optical viewing element 7. The illumination plane 31 is also displaced along the displacement direction 59 by the tilting of the scanning mirror.

In embodiments of an inclined-plane microscope 2a, for example an oblique plane microscope, the illumination plane 31 can be displaced in the sample by means of a displacement element, such as a translation stage.

The displacement of the illumination plane 31 in the SCAPE microscope 3 results in that the first intermediate image 37 of the illumination plane 31, which forms in the telescope 19, also shifts along the displacement direction 59. Since an imaging beam path 61 of the scattered or fluorescent light 33 also strikes the tilted scanning mirror 9, the offset of the imaging beam path 61 is compensated again by the scanning mirror 9 so that the imaging beam path 61a is static and not influenced by a movement of the scanning mirror 9. By means of the static imaging beam path 61a, the illumination plane 31, which may be in different positions in the sample 29, is thus imaged statically, i.e. always at the same point in the focal plane 43 on the area sensor 45.

In an inclined-plane microscope 2a designed as an oblique plane microscope, the first intermediate image 37 is static.

FIG. 1 also shows that three different coordinate systems are used for the description. The sample coordinate system 63 has the sample coordinates z and x, wherein sample coordinate z extends parallelly to the optical axis 23 of the optical viewing element 7.

Also shown is an illumination coordinate system 65, which includes the illumination coordinates x' and z'. A sensor coordinate system 67 is shown only with sensor coordinate z.

All coordinate systems 63, 65, 67 share a y coordinate, which does not have to be transformed when transitioning to another coordinate system.

An illumination direction 101, along which the illumination plane 31 is illuminated, extends along illumination coordinate z'.

FIG. 1 shows the SCAPE microscope 3 at point in time $t_1$, i.e., in the static representation, only image information from the drawn-in illumination plane 31 can be imaged on the area sensor 45 and displayed by the image data processor 49 as a preview image 71 by means of a display device 69.

However, the preview image 71 shown corresponds to a viewing plane 73 that coincides with the illumination plane 31 shown. The latter is tilted at the tilt angle 27 with respect to the optical axis 23 and makes the orientation in the sample 29 difficult for a user as a result of this tilting.

Figure 2:
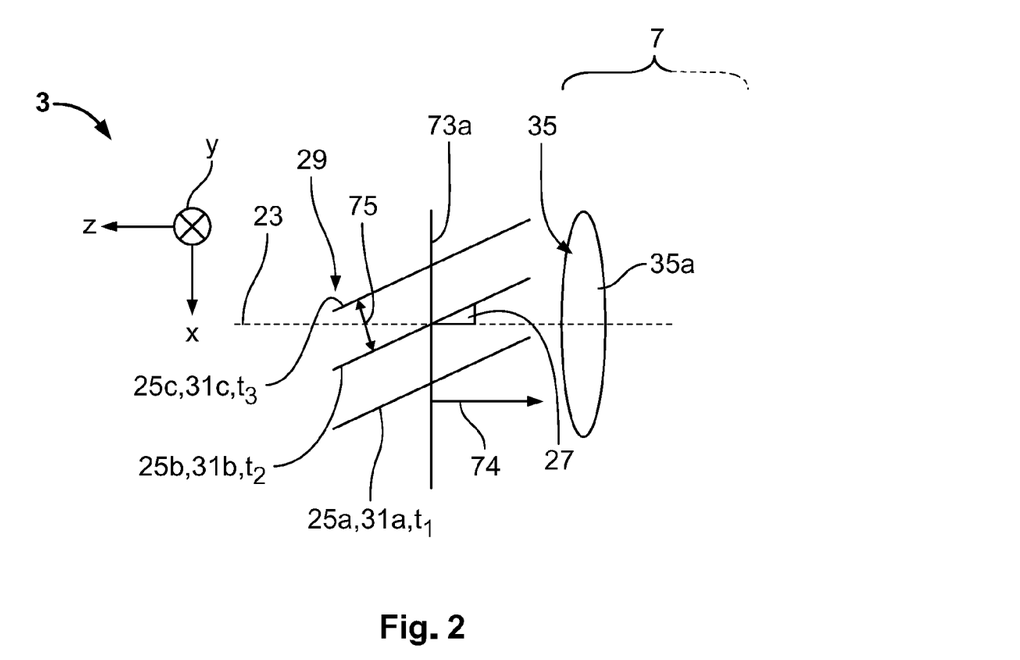
FIG. 2 a detailed illustration of three illumination planes.

FIG. 2 shows a detailed view of a SCAPE microscope 3, wherein only the pupil 35 and the front lens 35 of the optical viewing element 7 are shown.

FIG. 2 also shows illumination planes 31a, 31b, 31c, which are illuminated at points in time $t_1$, $t_2$, and $t_3$. Light sheets 25a-25c correspond to illumination planes 31a-31c and have a distance 75 to one another and are oriented substantially parallelly to each other, i.e., the illumination planes 31 shown are each tilted at the tilt angle 27 with respect to the optical axis 23.

FIG. 2 further shows a viewing plane 73a oriented perpendicularly to the optical axis 23 and enabling an easy orientation of the user in the sample 29. This preferred viewing plane 73a is spanned by sample coordinate x and the y coordinate. The viewing plane 73a has a normal vector 74, which is perpendicular thereto and oriented parallelly to the optical axis 23.

Figure 3:
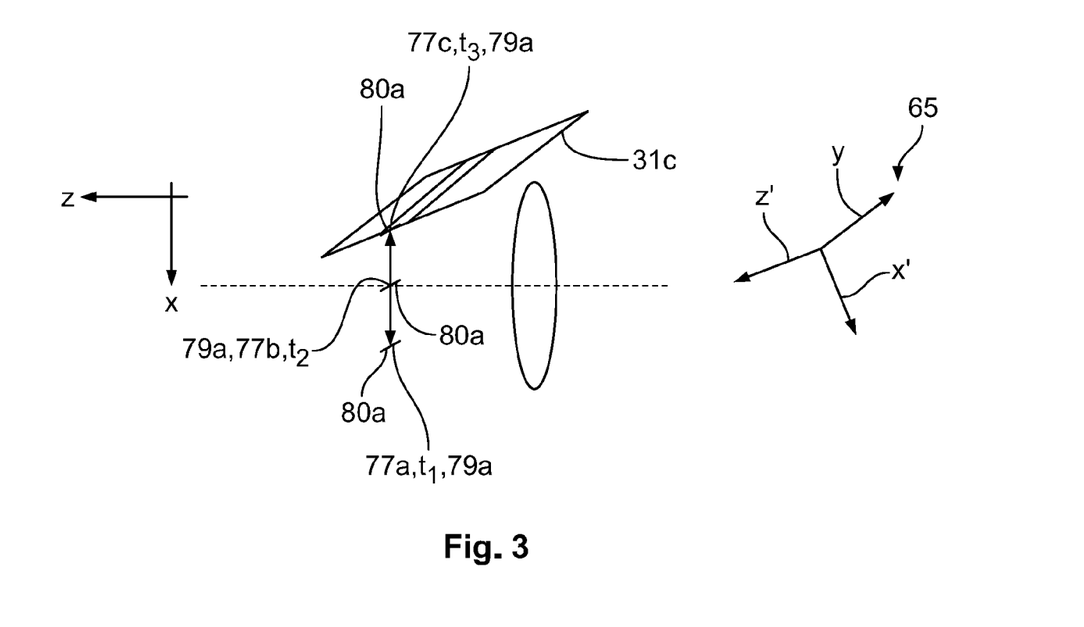
FIG. 3 a detailed illustration of three preview strips.

FIG. 3 shows the same situation as in FIG. 2, wherein only preview strips 77a, 77b, and 77c are shown, which are illuminated at points in times $t_1$, $t_2$, and $t_3$.

The preview strips 77a-77c shown in FIG. 3 are to be understood as strips 80a or strip-type sections 79a of the respective illumination planes 31, which is shown in the example of preview strip 77c with a perspective view of only this illumination plane 31c and this preview strip 77c. In order to clarify the perspective view, the illumination coordinate system 65 is drawn in for illumination plane 31c.

Figure 6:
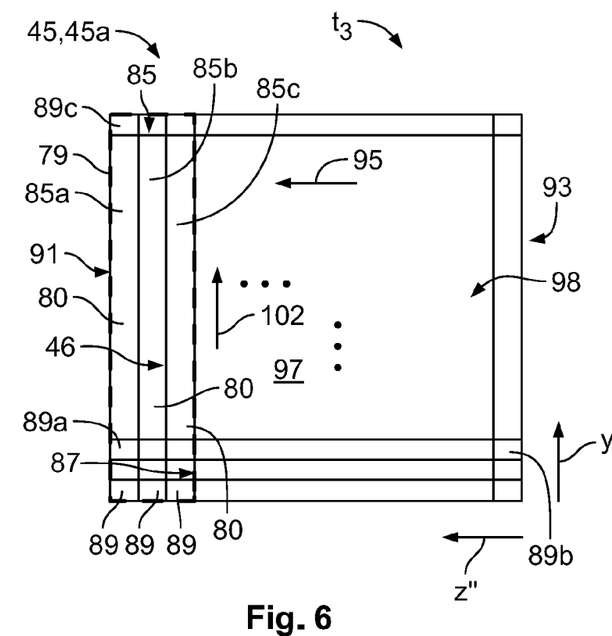
FIG. 6 a schematic top view of a first embodiment of an area sensor.

The circumstances shown in FIG. 3 are discussed again in the description of FIG. 6.

Figure 4:
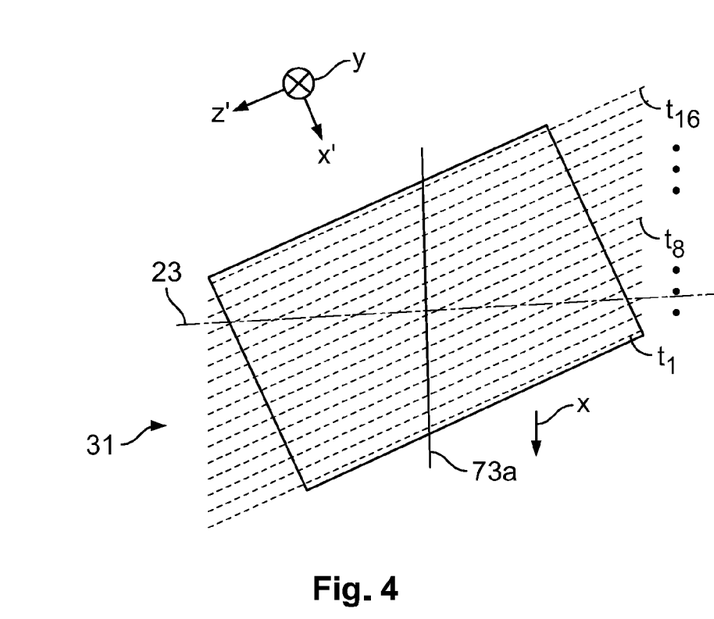
FIG. 4 a detailed illustration of a plurality of illumination planes.

FIG. 4 shows a plurality of illumination planes 31, which are illuminated at successive points in time $t_1$-$t_{16}$. The illumination planes 31 extend along illumination coordinate z' and the y coordinate. Also drawn in is the viewing plane 73a, which extends along sample coordinate x and the y coordinate.

The viewing plane 73a shown represents the viewing plane that can be managed most easily by a user since it is oriented perpendicularly to the optical axis 23 of the optical viewing element 7.

Thus, in order to generate a preview image 71 in the viewing plane 73a, it is necessary to combine image information in the form of brightness distributions 81 from a plurality of illumination planes 31, wherein only the brightness distribution 81 in the vicinity of the viewing planes 73a is used. This situation is illustrated in FIG. 5, which shows a plurality of preview strips 77, the preview strips 77 each being cut symmetrically from the viewing plane 73a.

A preview image 71 can thus be generated by averaging 83 of the individual brightness distributions 81 of the plurality of preview strips 77 along sample coordinate z.

Figure 5:
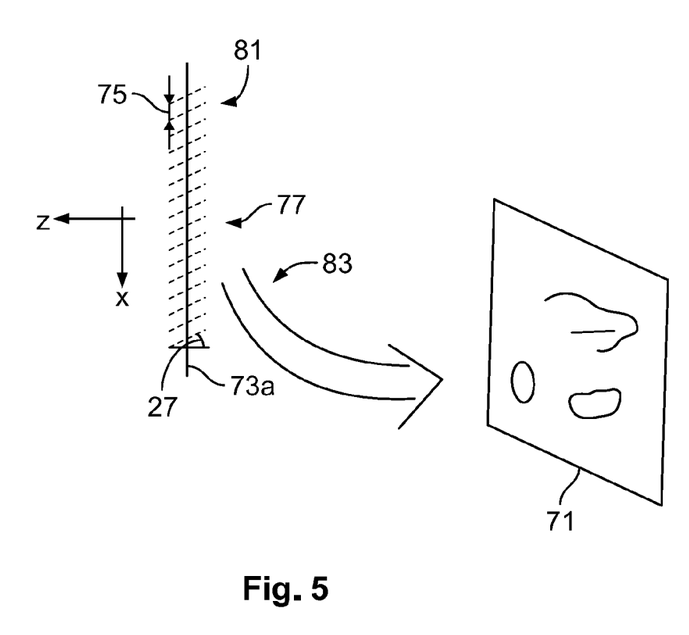
FIG. 5 a detailed illustration of a plurality of preview strips.

The generation of the preview image 71 is shown in FIG. 5 by way of example only. This does not take place optically in the sample 29 but rather with consideration of the distance 75 between the preview strips 77 and of the tilt angle 27 of the preview strips 77 in the image data processor 49 (see FIG. 1).

FIG. 6 shows a first embodiment of the area sensor 45 in a top view. The area sensor 45 is an area sensor 45a to be read out line-by-line, which comprises photosensitive elements 89, which form lines 85 and columns 87.

The lines 85 are oriented along they coordinate, whereas the columns 87 are oriented along sensor coordinate z".

The area sensor 45 shown has a read-out beginning 91 and a read-out end 93, which define a read-out direction 95. As a result, during a read-out process, the photosensitive element 89a is read out at the beginning of the read-out process, whereas the photosensitive element 89b is read out at the end of the read-out process.

Since the area sensor 45 shown is an area sensor 45a to be read out section-by-section, a read-out area 80 is read out in each read-out step so that the photosensitive element 89c is read out simultaneously with photosensitive element 89a. The read-out area 80 of the embodiment of the area sensor 45 shown in FIG. 6 comprises a line 85 and extends in a longitudinal extension 102.

In other embodiments of the area sensor 45, the read-out area 80 may comprise several lines along its entire length or section-by-section. The plurality of photosensitive elements 89 form a field 97, in which a charge carrier distribution 98 is generated by irradiated light. During reading-out, this charge carrier distribution 98 is shifted along the read-out direction 95 to the read-out beginning 91. The read-out direction 95 is thus to be understood as a physical read-out direction of the displacement of the charge carrier distribution 98.

If a read-out process is considered, a read-out area 80, i.e. a complete line 85, is read out sequentially, i.e. one after the other beginning with line 85a, followed by line 85b and line 85c, from the area sensor 45a to be read out section-by-section. If the read-out process is stopped after reading out line 85c, lines 85a-85c define a strip image 79, that is, an image 46 of preview strip 77 of the respective illumination planes 31. The strip image 79 shown in FIG. 6 comprises three read-out areas 80.

The strip image 79 on the area sensor 45 thus corresponds to a strip-type section 79a of the corresponding illumination plane 31. These strip-type sections 79a in the illumination plane 31 are shown and named as preview strips 77, 77a, 77b, 77c in FIGS. 3 and 5. At this point, it should again be mentioned that the selection of a strip-type section 79a in the illumination plane 31 is effected by reading out the strip image 79 of the area sensor 45 comprising a specific number of illumination planes 80, i.e., effected by the area sensor 45 and not by a limited illumination of the corresponding illumination plane 31.

The strip image 79 shown in FIG. 6 is recorded, for example, at point in time $t_3$ and thus corresponds to the image of the strip-type section 79, i.e., preview strip 77c of FIG. 3.

Figure 7:
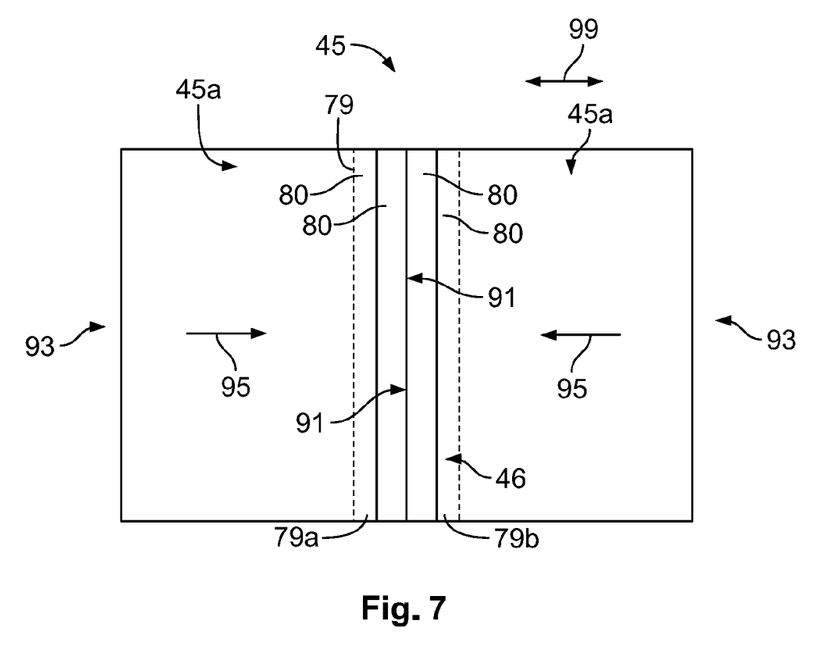
FIG. 7 a schematic top view of a second embodiment of an area sensor.

FIG. 7 shows a second embodiment of the area sensor 45, which comprises two area sensors 45a to be read out section-by-section.

Both area sensors 45a to be read out section-by-section have a read-out end 93 and a read-out beginning 91, wherein the read-out beginnings 91 are arranged next to one another and parallelly to one another. The read-out directions 95 of the two area sensors 45a to be read out section-by-section thus point to the adjacent read-out beginnings 91 from opposite directions.

Ideally, the image 46 of a preview strip 77 is imaged on the area sensor 45 shown in FIG. 7 such that the preview strip is imaged symmetrically on both area sensors 45a to be read out section-by-section and oriented along the cell-shaped read-out beginning 91 of each area sensor 45a to be read out section-by-section. Such a strip image 79 is shown in FIG. 7, wherein the strip image 79 has a first half 79b and a second half 79c, which are read out simultaneously by the respective area sensor 45a to be read out section-by-section during the read-out process.

In the embodiment shown in FIG. 7, both the first half 79b and the second half 79c of the strip image 79 each have two read-out areas 80 so that two read-out steps are necessary for reading out the strip image 79 shown.

As a result of the simultaneous read-out, a strip image 79 is read about twice as fast with the second embodiment of the area sensor 45 in FIG. 7 than the same strip image 79 is read out by the first embodiment of the area sensor 45 in FIG. 6.

Furthermore, the second embodiment of the area sensor 45 in FIG. 7 has the significant advantage that it can generate a preview image 71, which reproduces a viewing plane 73a, which is centered in the sample 29 in the direction of the optical axis 23. It is thus possible, with the aid of the preview image 71, which can be displaced by means of a movement 99 of the second embodiment of the area sensor 45 along the optical axis 23, to adjust the correct area for recording a three-dimensional microscopic image with full resolution. The first embodiment of the area sensor 45 in FIG. 6 also enables an orientation in the sample 29 with the aid of the preview image 71; however, the three-dimensional microscoped area is merely located above the viewing plane 73a in a recording with full resolution, unless the sample 29 or the line sensor 44 or area sensor 45 are repositioned accordingly.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for producing a preview image with an inclined-plane microscope with a tilted illumination plane, the method comprising:
    illuminating, at successive points in time, different illumination planes, which are tilted relatively to an optical axis of an optical viewing element and spaced apart from one another;
    imaging the illumination planes onto a sensor with photosensitive elements arranged line-by-line; and
    producing the preview image by successively reading out strip-type read-out areas of the sensor, a longitudinal extension of the read-out areas being oriented parallel to the lines of the photosensitive elements, such that the preview image reproduces a viewing plane perpendicular to the optical axis of the optical viewing element.

2. The method according to claim 1, wherein a preview strip of each of the illumination planes generated at the successive points in time is imaged on the sensor as a strip image which comprises at least one of the read-out areas.

3. The method according to claim 1, wherein one of the read-out areas is respectively read out from the sensor at the beginning of a read-out process.

4. The method according to claim 2, wherein the preview strip of each of the illumination planes is imaged on a read-out beginning of the sensor.

5. The method according to claim 1, wherein at least one of the read-out areas extends over at least two sensors that can be read out separately.

6. The method according to claim 1, wherein, for producing the preview image, the read-out areas that are successively read out are corrected and/or averaged as a function of a tilt angle of the respective illumination plane with respect to the optical axis of the optical viewing element and/or as a function of a distance between illumination planes illuminated at the successive points in time.

7. The method according to claim 1, wherein the sensor is displaced in order to change a position of the image of one of the illumination planes relative to the sensor.

8. An inclined-plane microscope, with a tilted illumination plane, the microscope comprising:
    an optical viewing element having an optical axis which is tilted relative to different illumination planes, which are spaced apart from each other and are present at successive points in time;
    a sensor configured to image the illumination planes, the sensor having photosensitive elements arranged line-by-line and strip-type read-out areas, a longitudinal extension of the read-out areas being oriented parallel to the lines of the photosensitive elements; and
    an image data processor with an interface configured to output a preview image, which reproduces a viewing plane perpendicular to the optical axis of the optical viewing element and is composed of the read-out areas which have been successively read out of an image of the successively illuminated illumination planes.

9. The microscope according to claim 8, wherein the sensor has at least one field of the photosensitive elements, which forms at least two of the read-out areas, which are to be read serially in a read-out direction, wherein at least one of the read-out areas is positioned at a read-out beginning of the sensor and the image of a preview strip is oriented perpendicular to the read-out direction.

10. The microscope according to claim 9, wherein at least two sensors are provided, the at least two sensors having read-out beginnings which are arranged opposite and substantially in parallel to each other.

11. The microscope according to claim 9, wherein the preview strip is imaged on the read-out beginning.

12. The microscope according to claim 8, wherein the sensor is arranged displaceably along the longitudinal extension of the read-out areas and/or along or opposite a read-out direction of the read-out areas.

13. The microscope according to claim 8, wherein the sensor rotatably arranged about a normal vector of the sensor in at least two rotational positions oriented substantially perpendicular to one another.

14. The microscope according to claim 8, wherein the image data processor comprises a correction and/or averaging device, which is configured to correct and/or average the read-out areas of the respective strip image, which are read out from the sensor by an image data read-out device at the successive points in time as a function of a tilt angle of the respective illumination plane with respect to the optical axis of the optical viewing element, and/or as a function of a distance between illumination planes illuminated at the successive points in time, so as to generate the preview image.

15. An image producing device for an inclined-plane microscope with a tilted illumination plane, which successively generates a plurality of illumination planes, which extend at a tilt relative to an optical axis of an optical viewing element and are spaced apart from each other, and images the illumination planes onto a sensor, the image producing device comprising:
    the sensor comprising photosensitive elements arranged line-by-line and strip-type read-out areas, a longitudinal extension of the read-out areas being oriented parallel to the lines of the photosensitive elements;
    an image data read-out device with an output, at which the respective read-out area, of an image of the respective illumination plane is to be provided in each case; and
    an image data processor configured to produce a preview image, which reproduces a viewing plane perpendicular to the optical axis of the optical viewing element, from the read-out areas which have been read out.

* * * * *